United States Patent [19]

Doktycz et al.

[11] Patent Number: 5,232,522

[45] Date of Patent: * Aug. 3, 1993

[54] RAPID OMNIDIRECTIONAL COMPACTION PROCESS FOR PRODUCING METAL NITRIDE, CARBIDE, OR CARBONITRIDE COATING ON CERAMIC SUBSTRATE

[75] Inventors: Stephen J. Doktycz; Kevin E. Howard, both of Midland, Mich.

[73] Assignee: The Dow Chemical Company, Midland, Mich.

[*] Notice: The portion of the term of this patent subsequent to Oct. 20, 2009 has been disclaimed.

[21] Appl. No.: 778,531

[22] Filed: Oct. 17, 1991

[51] Int. Cl.⁵ .............................................. C23C 14/34
[52] U.S. Cl. .................................. 148/218; 148/222; 148/237; 427/450; 427/455
[58] Field of Search ................ 148/218, 220, 222, 237; 427/34, 450, 455

[56] References Cited

U.S. PATENT DOCUMENTS

| | | | |
|---|---|---|---|
| 3,366,464 | 1/1968 | Guichet et al. | 427/34 |
| 3,684,585 | 8/1972 | Stroup | 148/278 |
| 4,094,709 | 6/1978 | Rozmus | 75/226 |
| 4,233,720 | 11/1980 | Rozmus | 29/407 |
| 4,239,819 | 12/1980 | Holzl | 148/279 |
| 4,341,557 | 7/1982 | Lizenby | 75/226 |
| 4,409,079 | 10/1983 | Miyazaki et al. | 427/34 |
| 4,483,720 | 11/1984 | Bartlett et al. | 427/376.6 |
| 4,526,748 | 7/1985 | Rozmus | 419/49 |
| 4,547,337 | 10/1985 | Rozmus | 419/49 |
| 4,562,090 | 12/1985 | Dickson et al. | 427/34 |
| 4,596,694 | 6/1986 | Rozmus | 419/49 |
| 4,597,730 | 7/1986 | Rozmus | 425/78 |
| 4,654,232 | 3/1987 | Sayano | 427/376.6 |
| 4,656,002 | 4/1987 | Lizenby | 419/10 |
| 4,760,369 | 7/1988 | Tiku | 338/308 |
| 4,783,248 | 11/1988 | Kohlhase | 204/192.17 |
| 4,784,313 | 11/1988 | Godziemba-Maliszewski | 228/194 |
| 4,839,239 | 6/1989 | Ducos et al. | 427/34 |
| 4,851,299 | 7/1989 | Godziemba-Maliszewski | 428/606 |
| 4,857,116 | 11/1989 | Allam | 148/279 |
| 4,935,073 | 6/1990 | Bartlett et al. | 148/247 |
| 5,156,725 | 10/1992 | Doktycz et al. | 204/192.16 |

FOREIGN PATENT DOCUMENTS

| | | | |
|---|---|---|---|
| 213696 | 9/1984 | German Democratic Rep. | 148/220 |
| 1027239 | 7/1983 | U.S.S.R. | 148/237 |

OTHER PUBLICATIONS

Desu et al, J. Am. Ceram. Soc., 73[3] 509-15 (1990).
Butt et al, J. Am. Ceram. Soc., 73:2690-96 (1990).
Nederveen et al, "The Densification of Plasma Sprayed Coatings by Subsequent Hot Isostatic Pressing".
Joshi et al, Metallurgical Transactions A, 21A:28-29-2837 (1990).
Prichard et al, "Vacuum Plasma Spray of Cb and Ta Metal Matrix Composites", pp. 561-568 (Feb. 1990).

Primary Examiner—George Wyszomierski

[57] ABSTRACT

A process is disclosed for forming a coating on a substrate. A metal layer is placed onto the substrate either by plasma spray deposition or by applying a metal foil and then subjecting it to rapid omnidirectional compaction. The metal is then reacted with a source of carbon, nitrogen, or a combination thereof, such that a metal carbide, nitride, or carbonitride layer is formed. The product is a densified coated ceramic composition.

11 Claims, No Drawings

RAPID OMNIDIRECTIONAL COMPACTION PROCESS FOR PRODUCING METAL NITRIDE, CARBIDE, OR CARBONITRIDE COATING ON CERAMIC SUBSTRATE

BACKGROUND OF THE INVENTION

The present invention relates to processes for forming coatings on ceramic substrates, as well as the products of such processes.

Ceramic materials are finding an ever-increasing number of uses due to their ability to provide desirable mechanical properties while being relatively light weight. One use that has become very important is in machine parts, where a workpiece must undergo repetitive contact with other objects, and thus must be capable of withstanding impact, friction, and/or wear. It is known that the utility of such workpieces, made of metal or ceramics, can be enhanced by providing them with coatings which will increase their superficial resistance to friction, wear, corrosion, impact, or the like.

Among the considerations in selecting or developing a desirable coating are the hardness, strength, and thermal stability of the coating; the chemical reactivity and thermal expansivity of the interface between the substrate and the coating; and the chemical reactivity of the coating's outer surface. These properties are affected by the microstructure of the coating, which depends on the raw materials used as well as the process used to generate the coating.

In achieving the desired mechanical and other properties in a coating, it is often useful to produce a multilayer coating, rather than a single layer of uniform composition. It is also useful to have a mechanism for eliminating or minimizing defects in the microstructure of the coating.

Although various ceramic coatings which have been previously known have some of the above-described desirable characteristics, there is still a need for improved structures which will have even more desirable properties, for the uses outlined above, as well as for other applications.

SUMMARY OF THE INVENTION

The present invention relates to a process for forming a coating on a ceramic substrate. The process comprises the following steps: (1) placing a metal layer onto a surface of a ceramic substrate, where the metal is selected from tantalum, titanium, zirconium, hafnium, tungsten, molybdenum, chromium, and niobium, and where the method of placing the metal layer is selected from the group consisting of (a) placing a metal foil on the substrate and then subjecting the metal layer to rapid omnidirectional compaction, such that the metal layer becomes bonded to the substrate, and (b) plasma spray depositing a metal onto the substrate; and (2) reacting the metal layer with a source of carbon, nitrogen, or a combination thereof, such that a metal carbide, nitride, or carbonitride layer is formed.

The source of the carbon, nitrogen, or a combination thereof in step (2) can be a gaseous mixture, such as argon/ammonia or argon/methane, in contact with the metal layer on the substrate, at an elevated temperature of at least 800° C., which causes a reaction of the metal layer with the gas. Alternatively, the source of carbon can be a carbon-containing foil which is placed onto the substrate in contact with the metal layer, and is then subjected to rapid omnidirectional compaction, causing the metal layer to react with the carbon-containing foil.

The present invention also relates to a densified coated ceramic composition which is made by a process as described in the preceding paragraphs. Without wishing to be bound to a particular theory, the coated composition is believed to have the following structure: (1) a ceramic substrate which includes at least one of carbon or nitrogen; (2) a first layer selected from metal nitride, metal carbide, and metal carbonitride which is on the exterior of the substrate; (3) a metal interlayer which is on the exterior of the first layer; and (4) a second layer selected from metal nitride, metal carbide, and metal carbonitride which is on the exterior of the metal interlayer.

The processes and compositions of the present invention have several advantages over prior processes and compositions. The present invention generates coatings which have a novel microstructure and highly desirable mechanical properties. For example, the coatings of the present invention are multilayer in nature and contain a gradient structure. The interfaces between the various coating layers are reaction-bonded, which contributes to stronger coating adherence to the substrate and better coating performance over a broad range of operating conditions. The use of rapid omnidirectional compaction removes defects from the coating microstructure. Because such defects can serve as points of origin for failure of the coating, their minimization causes the coating to last longer under high impact and/or wear applications. In addition, the removal of defects and the increased density of the coating can provide superior corrosion resistance, by reducing the ability of corrosive materials to permeate into the coating.

DETAILED DESCRIPTION OF SPECIFIC EMBODIMENTS

Suitable substrates for the present invention can include a variety of ceramic materials. Specific examples include aluminum nitride, silicon nitride, silicon carbide, titanium carbide, tungsten carbide, and tungsten carbide/6% cobalt. The substrates can take whatever shape is desired, such as a cutting insert for a machine tool.

The first step in the process is to apply a metal layer to the substrate. This can be done either by plasma spray deposition or by placing a metal foil on the substrate and then subjecting it to rapid omnidirectional compaction.

When the metal layer is deposited by plasma spray deposition, the following procedure can be used. Refractory metals are injected into a computer-controlled plasma gun in a vacuum chamber. A single metal can be sprayed, or two or more may be co-sprayed simultaneously. For example, WC-6% Co and WC-10% Co can be used for simultaneous injection into the plasma flame in the vacuum chamber, and thus for simultaneous impingement on the substrate. The composition gradient of the deposited layer can be altered by altering the feed rates of the two powders as a function of time.

Hydrogen is preferably added to the plasma flame, increasing the enthalpy of the flame and thereby providing for better melting of the sprayed particles It should be noted that unmelted particles tend to degrade the coating by producing voids or inhomogeneities.

The molten powder particles impinge on the surface of the substrate and solidify, forming a metallic coating with a density of about 60–70% of the density that can be achieved after rapid omnidirectional compaction. Multiple passes of the plasma spray apparatus may be used to deposit the desired amount of metal on the substrate. It is preferred to use a delay, for example of 5 minutes, between passes of the plasma gun over the substrate, in order to minimize thermally-induced stress in the coating. If a total of five passes are made, an overall thickness of 55-65 μm can typically result.

The coated samples are then cooled under a vacuum, prior to removal from the plasma spray chamber. This helps to minimize thermal shock in the coated object. The coated samples are then preheated for two hours to about 1200° C. to allow for interfacial diffusion, and then are subjected to rapid omnidirectional compaction at 0.8 GPa (120 ksi), for approximately 5-60 seconds.

When the metal layer is created by means of a foil, the metal foil is wrapped around the substrate before the rapid omnidirectional compaction. Suitable metal foils can have a thickness of 12 μm-1.0 mm and are available from Johnson Matthey or Aldrich Chemical. It is preferred to polish the surface of the substrate and remove organic impurities from its surface before wrapping it with the foil.

Briefly, the rapid omnidirectional compaction (ROC) process involves placing the coated substrate in the cavity of an apparatus, where the remainder of the cavity is then filled with a pressure transfer medium which is substantially incompressible and capable of plastic flow at elevated pressure and temperature Suitable elevated temperatures are between about 1200°-1500° C. When elevated pressure and temperature are applied to the pressure transfer medium by the apparatus, the medium transfers this pressure uniformly to the coated substrate in all directions. The ultimate result is densification of the coating that has been previously applied to the substrate.

Suitable ROC processes and apparatus are disclosed in one or more of the following U.S. patents, each of which is incorporated here by reference: U.S. Pat. Nos. 4,094,709; 4,233,720; 4,526,748; 4,547,337; 4,596,694; 4,597,730; 4,341,557; 4,656,002; and 4,562,090.

After the metal layer is placed on the substrate, the next step is to react it with a source of carbon, nitrogen, or a combination thereof. This can be done either through thermal conversion or the use of a second foil.

When a thermal conversion is used, the metal-coated substrate is brought into contact with a gaseous atmosphere at an elevated temperature, which is preferably between 1000°-1250° C. This can suitably be carried out in a furnace. The gaseous atmosphere preferably comprises a mixture of an inert gas (such as argon or helium) and either a carbon-containing or nitrogen-containing gas. For example, if the desired conversion is to nitride, the gas mixture can suitably be $Ar/NH_3$ in a 30:70 flow (ml/min) ratio. The metal-coated substrate is heated at a rate of about 4° C./minute. When it reaches 1000° C., the temperature is held constant for 1.5 hours, after which it is cooled at a rate of 5° C./minute. Other carbon-containing and nitrogen-containing gases which might be used include low hydrocarbons such as $C_2H_6$, $N_2$, CO, $CH_4$, and $C_2H_2$.

If the desired conversion is to carbide, the gas mixture can be $Ar/CH_4$ in a 70:30 flow (ml/min) ratio. The temperatures and heating rates used can be the same as described above.

Alternatively, the reaction of the metal layer can be accomplished by placing a thin carbon-containing foil, such as a graphite foil, on the metal-coated substrate, and then subjecting it to rapid omnidirectional compaction for approximately 5-60 seconds as outlined above. Suitable graphite foils can have a thickness of 0.12-0.25 mm (or possibly thicker) and are available as UCAR Grafoil TM from Union Carbide.

It would also be possible to oxidize the coatings to produce an oxide, if that was desired.

EXAMPLE 1

Plasma spray deposition was performed using a low-pressure plasma spray unit (Electro-Plasma, Inc. of California) operating at a chamber pressure of 30 torr, and an Allen Bradley control unit. The primary gas used throughout the plasma spray experiments was argon at 150 psig and a flow rate of 250 SCFH with a secondary gas of hydrogen (105 psig, 32 SCFH). The secondary gas was incorporated to improve the enthalpy of the plasma and consequently improve the melting of the metal feed powders The powder feed hopper was maintained at 40 psi with a gas flow of 13 SCFH and a powder feed rate of ca. 6.8 lb/hr. The feed hopper was rotated at a rate of 0.5 rpm. A stand-off distance of 12 inches between the plasma gun orifice and the substrate was used. Plasma operating conditions utilized 1500 amps and 56 V.

Tungsten and tantalum powders were vacuum-plasma deposited on SiC, self-reinforced $Si_3N_4$, WC-6% Co, and Dow AlN substrates. Wear bars of the substrate materials were ground and grit-blasted before being coated with the metal powders. The coating thickness was approximately 55-65 μm for all of the samples.

Preliminary experiments frequently resulted in coatings which readily delaminated. This appeared to arise from overheating of the substrate and from the difference in thermal expansion coefficients of the coating and substrate. Reduction of the number of preheat cycles to one and increasing the delay time between coating passes alleviated this problem. All coating passes were performed at the same robotic arm (which held the plasma gun) velocity. One cycle refers to passing the plasma gun over the substrate to a predetermined position and returning to the origin. In this procedure one cycle lasted 2 seconds.

EXAMPLE 2

Five samples which consisted of ceramic substrates, on which had been plasma-sprayed a tantalum film, were analyzed by X-ray powder diffraction for phase identification.

| Sample | Material |
|---|---|
| 1 | SRS-$Si_3N_4$ with Ta coating |
| 2 | Sintered AlN with Ta coating |
| 3 | SiC with Ta coating |
| 4 | WC/Co with Ta coating |
| 5 | WC'/Co with Ta coating |

Samples 1-4 had been subjected to rapid omnidirectional compaction after plasma-spraying. Sample 5 had only been plasma-sprayed.

The principal Ta phase prior to compaction (on sample 5) was $TaN_{0.1}$, JCPDS (Joint Committee on Powder Diffraction Standards) pattern #25-1278. All of the compacted samples, 1-4, exhibited a strong pattern corresponding to TaC, JCPDS pattern #35-801.

Sample 1 exhibited both gold- and silver-colored regions on the coated surface. Since the gold color was believed to be due to TaC, this region of sample 1 was analyzed by X-ray diffraction. To determine what other elements were present, qualitative x-ray fluorescence (EDXRF) was performed on sample 1. This analysis indicated the following elements were present: Ta, Y, Sr, Ca. Since EDXRF is qualitative, it was not possible to determine the amounts of these elements present in sample 1.

The following phases were identified by x-ray diffraction, listed in order of pattern intensity.

| 1. TaC, | JCPDS #35-801 |
|---|---|
| 2. $CaTa_4O_{11}$, | JCPDS #15-679 |
| 3. C, | JCPDS #25-284 (graphite) |
| 4. $\beta$-$Si_3N_4$, | JCPDS #33-1160 |
| 5. $SrTa_4O_{11}$, | JCPDS #16-708 |
| the following diffraction lines were not assigned: 5.17, 4.64, 3.49, and 2.52 Å. | |

Observations: Since the gold-colored region of the surface was analyzed, the graphite pattern was minor. The silver-colored region of sample 3 was analyzed, and a very strong graphite pattern was observed. Thus the silver coloration on the surface of sample 1 was due to the presence of graphite. Yttrium was identified as present in the sample (by EDXRF analysis). No yttrium phase was identified, but yttrium could substitute for both Ca and Sr in the $ATa_4O_{11}$ phases (A=Ca or Sr).

Sample 2 also exhibited both gold- and silver-colored regions on the Ta coated surface, but the gold-colored region was much larger, and more uniform than observed for sample 1. The most uniform section of the gold-colored region was analyzed by both X-ray diffraction and qualitative X-ray fluorescence (EDXRF). The following elements were found to be present: Ta, Y, Ca, Sr. No concentrations could be determined, but the signals due to Ta and Y were much stronger than the signals for Ca or Sr.

The following phases were identified by x-ray diffraction, listed in order of pattern intensity.

| 1. TaC, | JCPDS #35-801 |
|---|---|
| 2. AlN, | JCPDS #25-1133 |
| 3. $CaTa_2O_6$, | JCPDS #36-805 |
| 4. $AlTaO_4$, | JCPDS #25-1490 |
| 5. $CaTa_4O_{11}$, | JCPDS #15-679 |
| the following diffraction lines were not assigned: 5.18, 3.45, 2.32, 2.15, and 1.90 Å. | |

Observations: The graphite pattern observed from sample 2 was even weaker than that observed for sample 1. Although yttrium is a known additive to AlN as a sintering aid, (typically at the 3 wt. % level) no yttrium-containing phase was identified. As in the case of sample 1, Y could substitute for Ca in the Ca-Ta-O phases identified on the surface of sample 2.

Sample 3 exhibited both gold- and silver-colored regions, again similar to sample 1. A ca. 1 cm diameter circular area exhibited a fairly uniform gold color; the remainder of the 2.5 cm×7 cm surface was primarily silver. These two regions were analyzed separately by X-ray diffraction, and were found to exhibit similar diffraction patterns, with the exception of a very strong pattern due to graphite from the silver-colored region, which was the source of the silver color. The graphite pattern was strong because it was coated on top of the gold-colored TaC film, yielding the silver-colored regions of sample 3 as well as 1 and 2. Qualitative X-ray fluorescence analysis of sample 3 indicated the presence of the following elements: Ta, Si, and Ca. The signal for Ca was fairly weak.

The following phases were identified by x-ray diffraction, listed in order of pattern intensity.

| 1. TaC, | JCPDS #35-801 |
|---|---|
| 2. C, | JCPDS #25-284 |

Observations: Several of the lines fit the pattern of $CaTa_4O_{11}$ to some extent, but would have to have been an oriented phase, because some of the lines from the $CaTa_4O_{11}$ reference pattern were not observed in the pattern from sample 3. Also, some of the lines which appeared to "match" the $CaTa_4O_{11}$ pattern are shifted by differing amounts to lower d-spacings. This type of variation is usually caused by substitution of a different element (for Ca in this case) into the lattice. From the observed x-ray pattern, it was concluded that either $CaTa_4O_{11}$ or a structurally related phase was present in this sample.

Even after assuming that a $CaTa_4O_{11}$-type phase was present, many lines remained unidentified: 5.20, 4.67, 3.95, 3.91, 3.50, 3.45, 2.45, 2.39, 2.36, 2.32, 1.964, 1.948, 1.858, 1.780, 1.757, 1.744, 1.636, 1.468, 1.451, 1.269, 1.259, and 1.243 Å.

Sample 5 was the only sample not compacted after plasma-spraying. The sample was gold-grey in color. Closer visual inspection revealed that the gold color was present as small spots, as if the dark grey surface had been spray painted with gold. After compaction, (sample 4) two distinct regions were visible: a light gold and a dark gold region. The darker region was analyzed by x-ray diffraction.

Qualitative X-ray fluorescence of both samples indicated the presence of the following elements: Ta, Co. Analysis for Ca could not be performed because the samples would not fit in the instrument.

The following phases were identified in sample 5 by x-ray diffraction, listed in order of pattern intensity.

| 1. $TaN_{0.1}$, | JCPDS #25-1278 |
|---|---|
| 2. WC, | JCPDS #25-1047 |
| 3. W, | JCPDS #4-806 |

Observations: The diffraction lines for $TaN_{0.1}$ at approx. 65° and 97° 2$\theta$ are split into doublets. This could be due to substitution of W for Ta in the lattice, which could lower the symmetry.

The following phases were identified in sample 4 by x-ray diffraction, listed in order of pattern intensity.

| 1. TaC, | JCPDS #35-801 |
|---|---|
| 2. WC, | JCPDS #25-1047 |
| 3. $CaTa_4O_{11}$ | JCPDS #15-679 |
| 4. C, | JCPDS #25-284 |

Observations: Several of the lines fit the pattern of $CaTa_4O_{11}$, but the pattern was oriented. Virtually all of the $CaTa_4O_{11}$ lines were observed, but some were much weaker than predicted by the JCPDS standard pattern. From a comparison of the data from sample 4 with the data from sample 3 it was clear that the orientation of the $CaTa_4O_{11}$-type phase was much greater for sample 3 than 4.

As in the case of sample 3, some of the lines which appeared to "match" the $CaTa_4O_{11}$ pattern were shifted by differing amounts. The degree of line shift appeared to be less than observed for sample 3. This type of variation is usually caused by substitution of a different element (for Ca in this case) into the lattice.

Many lines remained unidentified. This residual pattern was virtually identical to the residual pattern observed for sample 3.

Unidentified lines: 5.20, 4.67, 3.95, 3.91, 3.50, 3.45, 2.45, 2.39, 2.36, 2.32, 1.964, 1.948, 1.858, 1.780, 1.757, 1.744, 1.636, 1.468, 1.451, 1.269, 1.259, and 1.243 Å.

The preceding description is intended to illustrate specific embodiments of the present invention, not to provide an exhaustive list of all possible embodiments. Persons skilled in this field will recognize that modifications could be made to the disclosed embodiments which would still be within the scope of the invention.

We claim:

1. A process for forming a coating on a ceramic substrate, including the steps of:
   placing a metal layer onto a surface of a ceramic substrate, where the metal is selected from tantalum, titanium, zirconium, hafnium, tungsten, molybdenum, chromium, and niobium, and where the method of placing a metal layer is comprised of placing a metal foil on the substrate and subjecting the metal layer to rapid omnidirectional compaction, such that the metal layer becomes bonded to the substrate; and reacting the metal layer with a source of carbon, nitrogen, or a combination thereof, where the source of carbon is a carbon-containing foil, where the carbon-containing foil is placed onto the substrate in contact with the metal layer, and where a rapid omnidirectional compaction step causes the metal layer to react with the carbon-containing foil, such that a metal carbide, nitride, or carbonitride layer is formed.

2. The process of claim 1, where the ceramic substrate is selected from aluminum nitride, silicon nitride, silicon carbide, tungsten carbide, and mixtures thereof with other metals.

3. A process for forming a coating on a ceramic substrate, including the steps of:
   placing a metal foil onto a surface of a ceramic substrate, where the metal is selected from tantalum, titanium, zirconium, hafnium, tungsten, molybdenum, chromium, and niobium;
   subjecting the metal layer to rapid omnidirectional compaction, such that the metal layer becomes bonded to the substrate; and
   reacting the metal layer with a source of carbon, nitrogen, or a combination thereof, such that a metal carbide, nitride, or carbonitride layer is formed.

4. The process of claim 3, where the source of carbon is a carbon-containing foil, where the carbon-containing foil is placed onto the substrate in contact with the metal layer, and where a rapid omnidirectional compaction step causes the metal layer to react with the carbon-containing foil.

5. The process of claim 4, where the carbon-containing foil consists essentially of graphite.

6. The process of claim 3, where the source of carbon is a carbon-containing foil, and where the carbon-containing foil is placed onto the substrate after the metal layer is subjected to a rapid omnidirectional compaction step, and subsequently a second rapid omnidirectional compaction step is used to cause the metal layer to react with the carbon-containing foil.

7. The process of claim 3, where the source of carbon, nitrogen, or a combination thereof is a gaseous atmosphere in contact with the metal layer on the substrate, and where the reaction of the metal layer with the gaseous atmosphere is caused by an elevated temperature of at least 800° C.

8. The process of claim 7, where the gaseous atmosphere consists essentially of a mixture selected form argon/ammonia and argon/methane.

9. A process for forming a coating on a ceramic substrate, including the steps of:
   depositing a metal layer onto a surface of a ceramic substrate, where the metal is selected from tantalum, titanium, zirconium, hafnium, tungsten, molybdenum, chromium, and niobium, and where the depositing is done by plasma spray deposition; and reacting the metal layer with a source of carbon, nitrogen, or a combination thereof, where the source of carbon is a carbon-containing foil, where the carbon-containing foil is placed onto the substrate in contact with the metal layer, and where a rapid omnidirectional compaction step causes the metal layer to react with the carbon-containing foil, such that a metal carbide, nitride, or carbonitride layer is formed.

10. The process of claim 9, where the carbon-containing foil consists essentially of graphite.

11. The process of claim 9, where the metal layer deposited onto the substrate is between about 50-100 microns thick prior to rapid omnidirectional compaction.

* * * * *